United States Patent
Morrison et al.

(10) Patent No.: US 12,390,727 B2
(45) Date of Patent: Aug. 19, 2025

(54) SYSTEMS AND METHODS FOR HANDHELD CONTROLLER CHARACTER ENTRY

(71) Applicant: Dell Products L.P., Round Rock, TX (US)

(72) Inventors: Jason Scott Morrison, Chadron, NE (US); Tyler Ryan Cox, Austin, TX (US); Erik Summa, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 347 days.

(21) Appl. No.: 18/150,017

(22) Filed: Jan. 4, 2023

(65) Prior Publication Data

US 2024/0216801 A1 Jul. 4, 2024

(51) Int. Cl.
  *A63F 13/00* (2014.01)
  *A63F 13/42* (2014.01)
  *A63F 13/5372* (2014.01)
  *A63F 13/69* (2014.01)

(52) U.S. Cl.
  CPC .......... *A63F 13/42* (2014.09); *A63F 13/5372* (2014.09); *A63F 13/69* (2014.09)

(58) Field of Classification Search
  CPC .......... A63F 13/00; A63F 13/22; A63F 13/42; A63F 2300/6045
  See application file for complete search history.

(56) References Cited

U.S. PATENT DOCUMENTS

| | | | |
|---|---|---|---|
| 2004/0070567 A1* | 4/2004 | Longe | G06F 3/04897 345/156 |
| 2007/0132887 A1* | 6/2007 | Boyden | H04N 21/42206 348/E5.103 |
| 2007/0242036 A1* | 10/2007 | Wilson | G06F 3/0236 345/156 |
| 2008/0215975 A1* | 9/2008 | Harrison | A63F 13/213 715/706 |
| 2010/0125811 A1* | 5/2010 | Moore | G06F 3/0236 715/846 |
| 2010/0306702 A1* | 12/2010 | Warner | G06F 3/0482 715/834 |
| 2014/0049477 A1* | 2/2014 | Dai | G06F 3/04886 345/173 |

(Continued)

OTHER PUBLICATIONS

Overby, Stephanie "Hardware—One Keyboard, Hold the Keys" CIO, Aug. 15, 2001, www.cio.com.

*Primary Examiner* — Justin L Myhr
(74) *Attorney, Agent, or Firm* — Norton Rose Fulbright US LLP

(57) ABSTRACT

An information handling system may receive a first input indication from a first control stick of a handheld controller, wherein the first input indication indicates that the first control stick is in a first position, receive a second input indication from a first button of the handheld controller, wherein the second input indication indicates that the first button is pressed while the first control stick is in the first position, and determine that the first input indication corresponds to a first character in response to receipt of the first input indication. The information handling system may then select the first character based on the determination that the first input indication corresponds to the first character and receipt of the second input indication.

20 Claims, 13 Drawing Sheets

(56) References Cited

U.S. PATENT DOCUMENTS

| | | | | |
|---|---|---|---|---|
| 2014/0298237 A1* | 10/2014 | Galu, Jr. | ............... | G06F 3/0482 |
| | | | | 715/773 |
| 2014/0329593 A1* | 11/2014 | Akkarakaran | ........ | A63F 13/533 |
| | | | | 463/31 |
| 2015/0160856 A1* | 6/2015 | Jang | .................... | G06F 3/04886 |
| | | | | 715/773 |
| 2017/0114521 A1* | 4/2017 | Wuisan | ................ | E02F 9/2004 |

* cited by examiner

SYSTEMS AND METHODS FOR HANDHELD CONTROLLER CHARACTER ENTRY

FIELD OF THE DISCLOSURE

The instant disclosure relates to information handling systems. More specifically, portions of this disclosure relate to text entry using a handheld controller connected to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A variety of input devices are available for use in providing user input to information handling systems. For example, one popular combination of input devices is the keyboard and mouse. A mouse may provide cursor and motion input to an information handling system, while a keyboard may provide up to one hundred or more specific inputs mapped to specific keys of the keyboard. Another popular input device is the handheld controller. Handheld controllers may provide fewer keys or buttons for input than a keyboard but may be more ergonomic to hold and use in certain situations, such as when using an information handling system away from a desk. Furthermore, handheld controllers may allow for types of inputs that are not present in a mouse and keyboard combination, such as control stick inputs. However, handheld controllers may not provide the wide array of selectable inputs provided by a mouse and keyboard combination.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may receive input from one or more control sticks of a handheld controller corresponding to one or more characters to allow a user to easily enter text using the handheld controller. For example, control stick positions may be mapped to different characters, and a button may be pressed to select a character when a control stick is moved to a position corresponding to the character. Graphical indications of which characters, or sets of characters, are mapped to which control stick positions may be presented on a display by an information handling system. Such text entry may improve a user experience by allowing a user to quickly learn to enter text using control stick positions of a handheld controller. Furthermore, use of control sticks, or other input devices, for text entry as described herein may allow a user to rapidly enter text using a handheld controller.

An information handling system may receive a first input indication from a first control stick of a handheld controller. The first input indication may indicate that the first control stick is in a first position. The information handling system may then receive a second input indication from a first button of the handheld controller. The second input indication may indicate that the first button is pressed while the first control stick is in the first position. For example, a user may move a control stick to a position corresponding to a character, and, while the control stick is held in the position corresponding to the character, may press a first button to select the character. The first information handling system may determine that the first input indication corresponds to a first character in response to receipt of the first input indication and may select the first character based on the determination that the first input indication corresponds to the first character and receipt of the second input indication.

In some embodiments, a first control stick may be used to input selection of a particular character, while a second control stick may be used to input selection of a group of characters including the particular character. For example, a plurality of inputs of the second control stick may be mapped to a plurality of groups of characters, and when a character group is selected using the second control stick, the characters of the selected character group may be mapped to a plurality of inputs of the first control stick. The first control stick may then be used to select a character of the selected character group. For example, an information handling system may receive a third input indication from a second control stick of the handheld controller. The third input indication may indicate that the second control stick is in a second position. The information handling system may determine that the third input indication corresponds to a first set of characters in response to receipt of the third input indication. The first set of characters may include the first character, and determining that the first input indication corresponds to the first character may be performed based on the determination that the third input indication corresponds to the first set of characters.

In some embodiments, graphical indications of which characters and/or sets of characters are assigned to which control stick positions may be displayed for a user. The graphical indications may be updated to reflect current positioning of the control sticks, indicating to a user which character will be selected if the user presses the first button. For example, the information handling system may display a first graphical indication of a plurality of characters corresponding to a first plurality of inputs of the first control stick and a second graphical indication of a plurality of sets of characters corresponding to a second plurality of inputs of the second control stick. The information handling system may update the first graphical indication based on receipt of the first input indication to include an indication of the first position corresponding to the first character and the second graphical indication based on receipt of the third input indication to include an indication of the second position corresponding to the first set of characters. Thus, graphical indications may be updated based on received control stick inputs to guide a user for character entry.

In some embodiments, each of two control sticks may be used to enter different characters. For example, a first set of characters may each be assigned to positions of the first control stick and a second set of characters may each be assigned to positions of the second control stick. In some embodiments, such positions may include control stick positions in an inner area of a range of movement of the control stick, such as positions closer to an origin of the control stick, and positions in an outer area of a range of movement of the control stick, such as positions beyond a certain distance from an origin of the control stick. As one example, the information handling system may receive a third input indication from a second control stick of the handheld controller. The third input indication may indicate that the second control stick is in a second position. The information handling system may receive a fourth input indication from the first button of the handheld controller. The fourth input indication may indicate that the first button is pressed while the second control stick is in the second position. The information handling system may determine that the third input indication corresponds to a second character, different from the first character, in response to receipt of the third input indication. The information handling system may then select the second character based on the determination that the third input indication corresponds to the second character and receipt of the second input indication. In some embodiments, determining that the first input indication corresponds to a first character comprises determining whether the first position is in an inner area of a range of movement of the first control stick or an outer area of a range of movement of the first control stick. Thus, each of two, or more, control sticks may be mapped to multiple character inputs for different positions of the control sticks.

Graphical indications of which characters and/or sets of characters are assigned to which control stick positions may also be displayed for a user when different characters are assigned to different positions of each of first and second control sticks. For example, an information handling system may display a first graphical indication of a first plurality of characters corresponding to a first plurality of inputs of the first control stick and may also display a second graphical indication of a second plurality of characters, different from the first plurality of characters, corresponding to a second plurality of inputs of the second control stick. The information handling system may update the first graphical indication based on receipt of the first input indication to include an indication of the first positions corresponding to the first character and may also update the second graphical indication based on receipt of the third input indication to include an indication of the second position corresponding to the second character.

In some embodiments, additional buttons, such as shoulder buttons, may be used to further adjust characters corresponding to positions of control sticks of a handheld controller. For example, a shoulder button may be used to toggle between symbols, numbers, lower case letters, and upper case letters mapped to positions of a control stick of a handheld controller. In some embodiments, the method may further include receiving a third input indication from a first shoulder button of the handheld controller. Determining that the first input indication corresponds to the first character may be performed based on the third input indication.

In some embodiments, an information handling system may include a memory and a processor for performing the methods described herein. A computer program product may include a non-transitory computer-readable medium including instructions for causing an information handling system to perform the method described herein.

For example, the methods described herein may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art. As used herein, "pressing" may refer to touching of a surface or applying pressure to a surface of a device, such as a touchpad.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
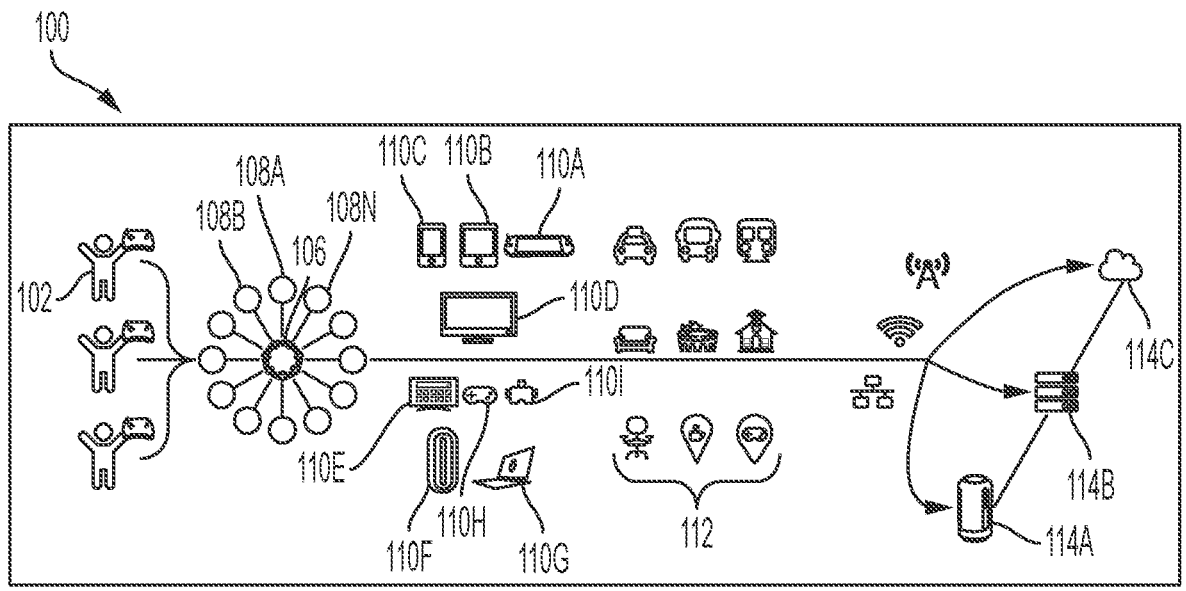
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
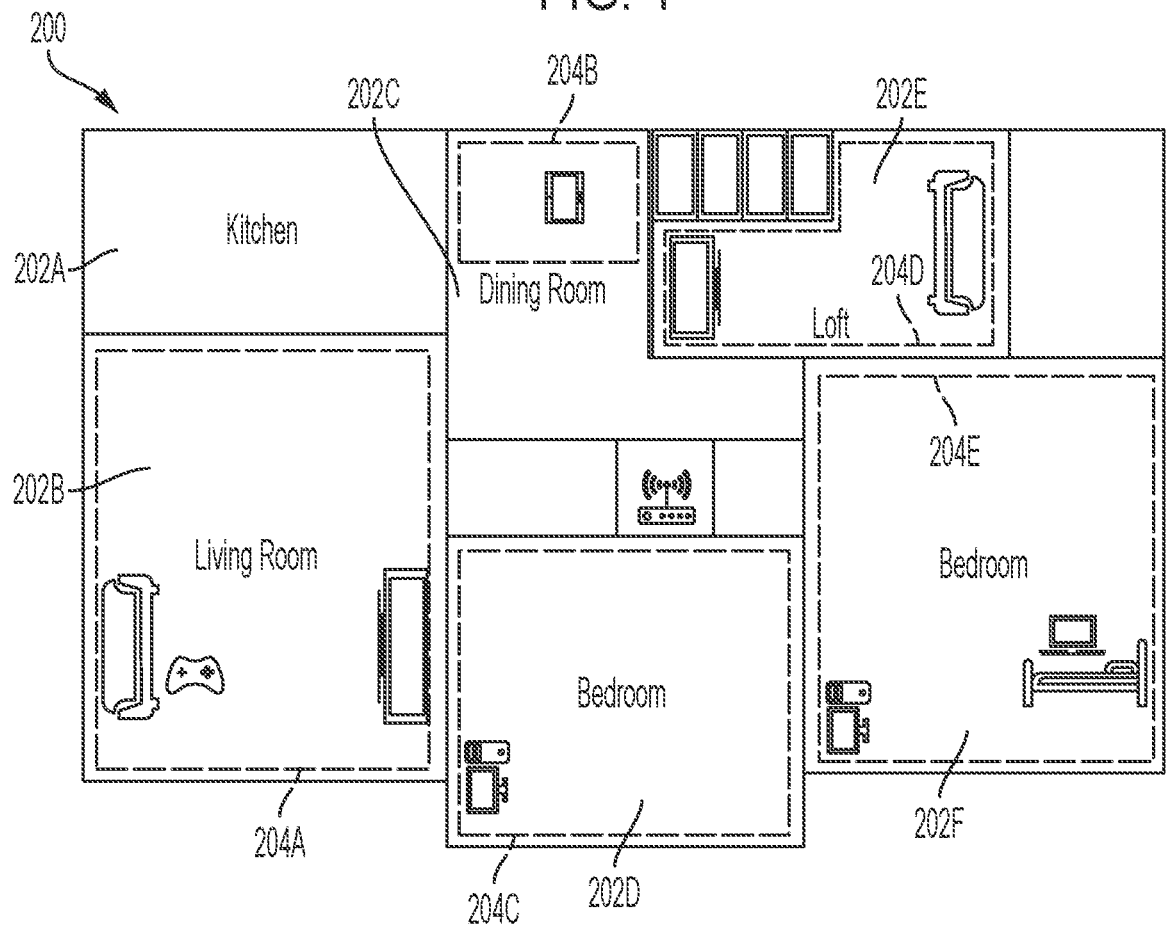
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
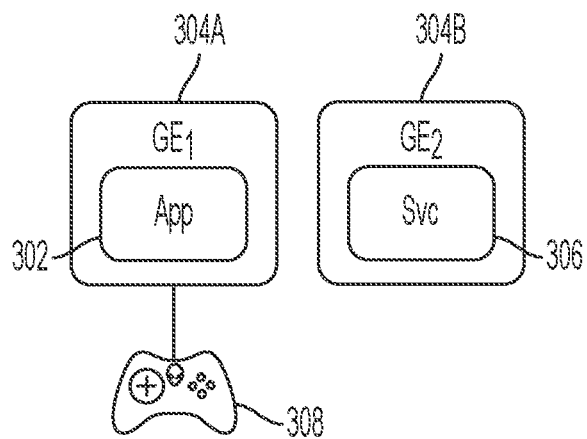
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
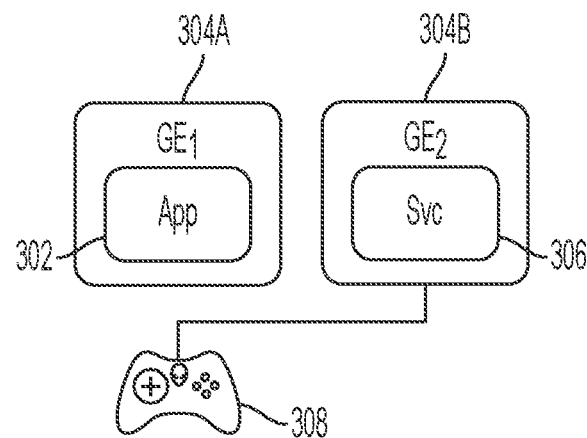
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
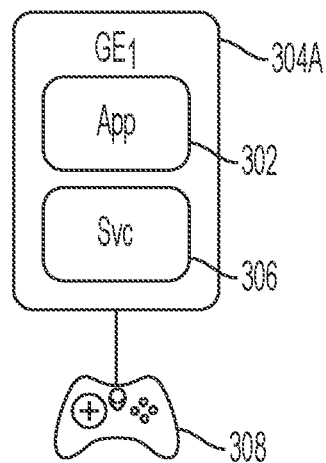
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
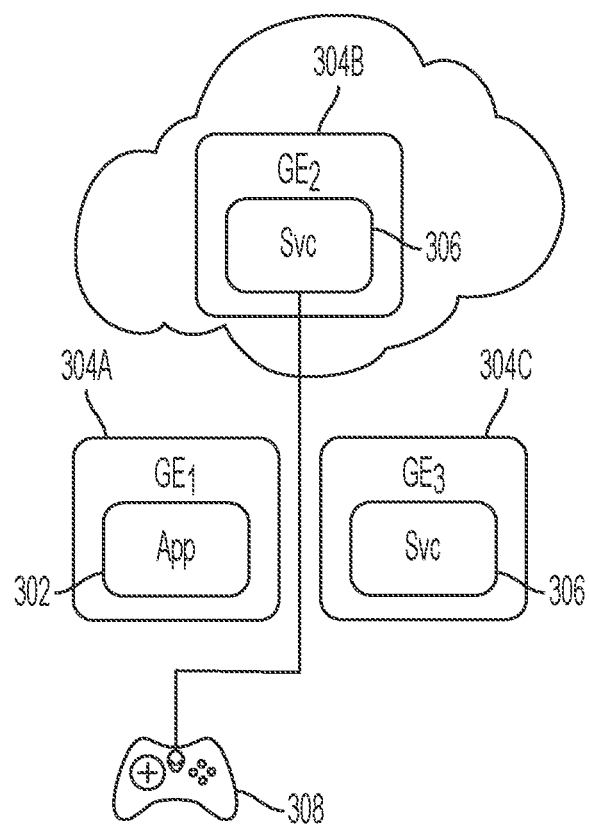
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4A:
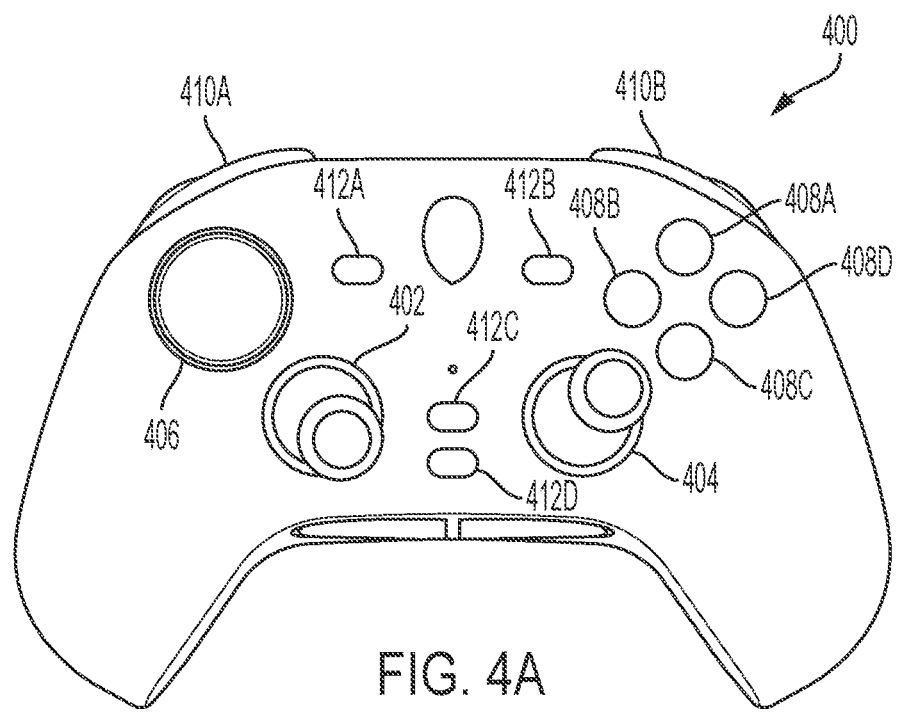
FIG. 4A is a perspective view of an example handheld controller according to some embodiments of the disclosure.
Figure 4B:
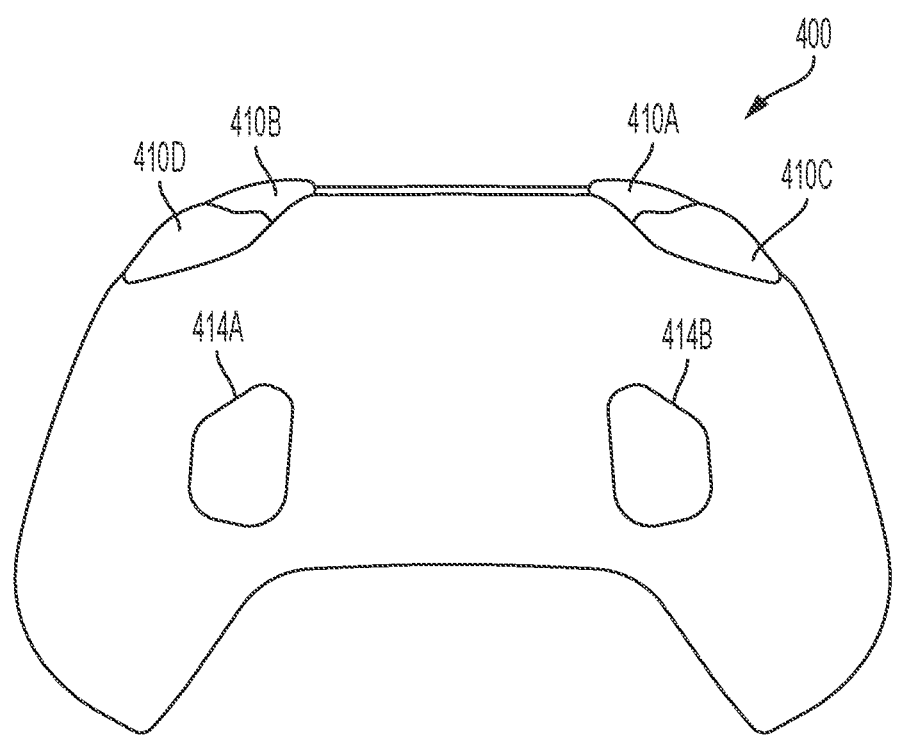
FIG. 4B is a perspective view of an example handheld controller according to some embodiments of the disclosure.

As discussed above, a controller, such as a handheld controller, is one device that may be used by a user to provide input to an information handling system. A number of inputs of a handheld controller may, however, be limited when compared a number of inputs of a mouse and keyboard. In order to facilitate efficient text entry by a user, positioning of one or more control sticks of a handheld controller may be used to select characters for entry by an information handling system. An example handheld controller 400 is shown in FIG. 4. The controller 400 may include a variety of inputs, such as a first shoulder button 410A, a second shoulder button 410B, a touch input pad 406, a first set of buttons 408A-D, a second set of buttons 412A-D, a first control stick 402, and a second control stick 404. First and second shoulder buttons 410A-B may, for example, be shoulder bumper buttons. FIG. 4B shows a back of controller 400, including first and second rear buttons 414A-B, and third and fourth shoulder buttons 410C-D. Third and fourth shoulder buttons 410C-D may, for example, be shoulder trigger buttons.

Input indications from the first and second control sticks 402, 404 may be used by an information handling system to determine sets of characters and/or specific characters for selection by a user. For example, different positions of control stick 404 may each be mapped to different groups of characters, and different positions of control stick 402 may each be mapped to different characters of a group of characters selected by control stick 404. Thus, a user may select a group of characters based on a position in which the user holds control stick 404, and may select a specific character of the selected group of characters based on a position in which the user holds control stick 402. In some embodiments, touch pad 406 may be used in addition to or in place of control stick 402 for character selection. In such embodiments, areas of a touchpad may be assigned to characters or groups of characters similar to areas of motion of control stick 402. In some embodiments, positions of control stick 404 may be mapped to different groups of characters, while positions of control stick 402 may be mapped to different characters of a selected group of characters. In some embodiments one or more of buttons 410A-D, may be used by a user to select a character indicated by a position of control sticks 402, 404. For example, a user may hold control stick 404 in a first position to select a first group of characters, may hold control stick 402 in a second position to select a first character of the first group of characters, and may press a button, such as button 414A to instruct an information handling system to select the character indicated by the positions of control sticks 402, 404. Thus, an information handling system may receive, from the controller 400, a first input indication from the first control stick 402 that indicates that the first control stick is in a first position. The information handling system may receive a second input indication from a first button of the handheld controller 400, such as one of buttons 410A-D, 414A-B, 408A-D, or 412A-D, indicating that the first button is pressed while the first control stick 402 is in the first position. The information handling system may determine that the first input indication corresponds to a first character, such as a first character mapped to the position of the first control stick 402, and may select the character based on the determination.

In some embodiments, the information handling system may further receive a third input indication from a second control stick 404 of the handheld controller 400 indicating that the second control stick 404 is in a second position and may determine that the third input indication corresponds to a first set of characters of a plurality of sets of characters. Then, the information handling system may determine the character indicated by the position of the first control stick 402 based on the selected set of characters. In some embodiments, a button of the controller 400, such as button 414B may be selected by a user to enter a backspace to delete a character. In some embodiments, one or more buttons, such as shoulder button 410A may be used to adjust a case or Unicode variant of the selected character. For example, while the first control stick 402 and the second control stick 404 are held in first and second positions, a user may press shoulder button 410A to adjust a case or Unicode variant of the selected character.

An information handling system may adjust a case or Unicode variant of a selected character based on receipt of an input indication indicating that the shoulder button 410A or other shoulder button was pressed while the first control stick 402 was in the first position corresponding to the selected character. As another example, a right shoulder button 410B may be used by a user to toggle between capital character selection, lower case character selection, and number or symbol character selection. Thus, a full array of alphabetical, or other, characters, numbers, and symbols may be selectable by a user using controls sticks and buttons of a handheld controller 400. In some embodiments, control sticks 402, 404 or touch input 406 may provide localized haptic feedback based on inputs received, such as to indicate when a control stick is moved across a border between areas assigned to different characters.

Figure 4C:
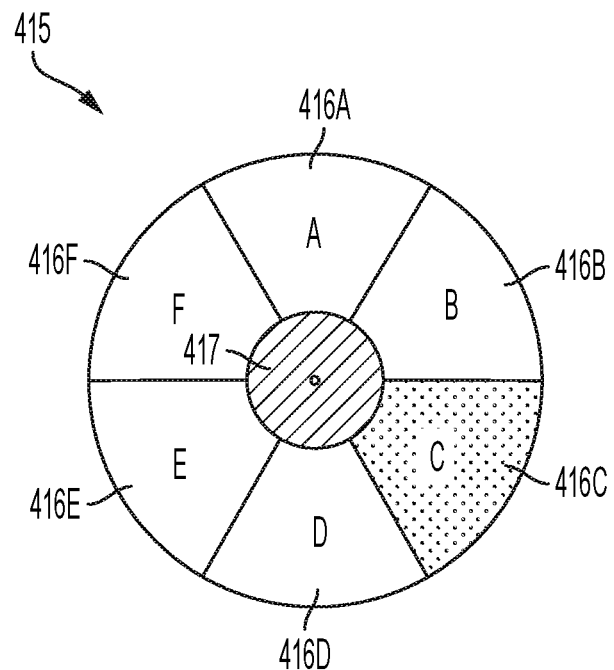
FIG. 4C is a layout of an example mapping of characters to a plurality of positions of a control stick according to some embodiments of the disclosure.
Figure 4D:
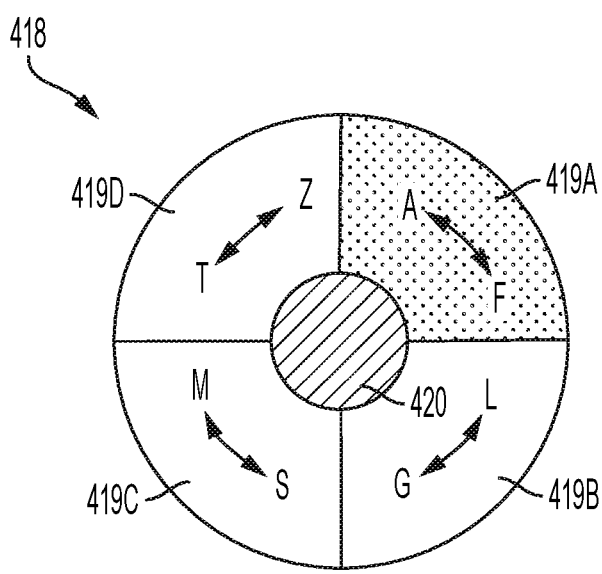
FIG. 4D is a layout of an example mapping of sets of characters to a plurality of positions of a control stick according to some embodiments of the disclosure.
Figure 4E:
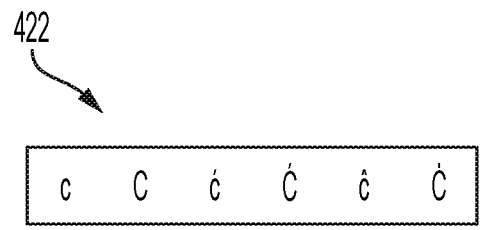
FIG. 4E is an example layout of character adjustment options according to some embodiments of the disclosure.
Figure 4F:
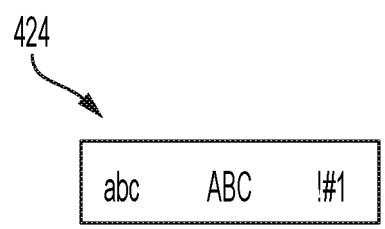
FIG. 4F is an example layout of character adjustment options according to some embodiments of the disclosure.

An example mapping 415 of characters to positions of a control stick of a handheld controller is shown in FIG. 4C, and an example mapping 418 of sets of characters to positions of a control stick of a handheld controller is shown in FIG. 4D. In some embodiments, the mapping 415 may be applied to the control stick 402 of the controller 400 and the mapping 418 may be applied to the control stick 404 of the handheld controller 400. In some embodiments, the characters of mapping 415 may be adjusted based on selection of a group of characters according to mapping 418. For example, mapping 418 may divide a range of movement of a control stick, such as control stick 404, into a plurality of wedges, such as four equal wedges. A first wedge 419A may be mapped to a set of characters including A-F, a second wedge 419B may be mapped to a set of characters including G-L, a third wedge 419C may be mapped to a set of characters M-S, and a fourth wedge 419D may be mapped to a set of characters T-Z, although other mappings of other groups of characters may be used. Thus, when second control stick 404 mapped to sets of characters by mapping 418, is in the first position shown in FIG. 4A, an indication of the position of the second control stick 404 may be sent to an information handling system, and the information handling system may determine, based on the indication of the input that the first set of characters A-F should be mapped to the first control stick 402.

Likewise, a set of characters, such as a set of characters determined based on selection using the mapping 418, may be mapped to the first control stick 402 by mapping 415. For example, a first wedge 416A may be mapped to a first character, a second wedge 416B may be mapped to a second character, a third wedge 416C may be mapped to a third character, a fourth wedge 416D may be mapped to a fourth character, a fifth wedge 416E may be mapped to a fifth character, and a sixth wedge 416F may be mapped to a sixth wedge. Thus, a range of movement of the first control stick 402 may be divided into six wedges, with each wedge corresponding to a character. In some embodiments, different-shaped areas and/or fewer or more than six areas may be used for assignment of characters to different positions of a control stick. Thus, when the first control stick 402 is in the first position shown by FIG. 4A, an indication of the position of the first control stick 402 may be sent to the information handling system, and the information handling system may determine, based on the indication of the input of the first control stick 402, that the character C is selected. In some embodiments, such a determination may be further based on pressing of a button of controller 400 by a user to select a character determined based on the positions of the first and second 402, 404 control sticks. In some embodiments, a character, such as a period, may be mapped to a null or center position 417, and a character, such as a space, may be mapped to a null or center position 420.

In some embodiments, different cases, or Unicode variants, of a character may be toggled by pressing a shoulder button. For example, in the selection of variants shown in layout 422 of FIG. 4E, a variety of options for a character "c" may be selected by pressing a button, such as a shoulder button 410A of controller 400. Likewise, a user may toggle different sets of characters assigned to wedges or areas of movement of the mapping 418. For example, a user may toggle between sets of lower case characters, sets of upper case characters, or sets of numbers and symbols according to layout 424 of FIG. 4F by pressing a button, such as a shoulder button 410B of controller 400. Thus, a variant of a character selected according to layout 417 and/or a layout of character sets mapped according to layout 418 may be adjusted by pressing one or more buttons of a handheld controller. As one particular example, shoulder buttons 410A-B, may be bumpers with horizontal touch sensing functionality and haptics, providing a mouse scroll wheel effect. Thus, a user may swipe a finger along a shoulder button 410A to select one of variants of a selected character shown in layout 422 of FIG. 4E. As another example, shoulder buttons 410C-D may be pressure sensitive with haptics. Thus, a user may press button 410D a certain amount to select one of the lower case, upper case, and symbol options shown in layout 424 of FIG. 4F. In some embodiments, shoulder buttons 410A, C and 410B, D may each be assigned to the same functionality for character selection.

In some embodiments, layouts 415, 418, 420, and 422 may be displayed on a display for use by a user of an information handling systems. For example, display of layouts 415 and 418 may allow a user to determine which characters and/or sets of characters are assigned to which positions of the control sticks 402, 404. In some embodiments, when input is received from a handheld controller, a displayed layout may be adjusted to allow a user to determine the characters and/or sets of characters corresponding to current positioning of control sticks 402, 404. For example, when input from control stick 404 is received by an information handling system indicating that the control stick 404 is in position 419A, position 419A of layout 418 may be highlighted for a user. Furthermore, display of layout 415 may be updated to include display of characters A-F each assigned to an area of layout 415. When input from control stick 402 is received by an information handling system indicating that the control stick 402 is in position 416C, position 416C of layout 415 may be highlighted for a user. Thus displayed layouts may enable a user to determine a character corresponding to current positions of control sticks 402, 404 before pressing a button to select the character. Layouts 422, 424 may also be displayed for a user and may be similarly updated based on user input corresponding to the layouts 422, 424.

Figure 5A:
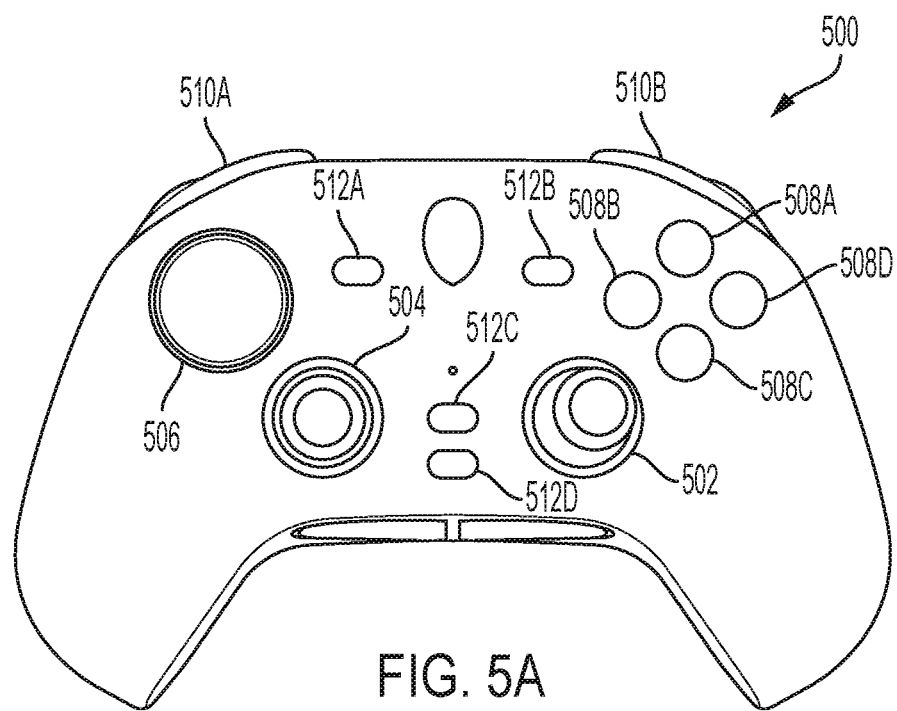
FIG. 5A is a perspective view of an example handheld controller according to some embodiments of the disclosure.

In some embodiments, individual characters may be assigned to individual positions of each of two, or more, control sticks, in place of or in addition to using a control stick to select a set of characters from among a plurality of sets of characters. An example controller 500 is shown in FIG. 5A. The controller 500 may be the same as controller 400 of FIGS. 4A-B, but shows the first control stick 402 and second control stick 404 in different positions. Different layouts for character entry may be assigned to control sticks 402, 404 of FIG. 5A than control sticks 402, 404 of FIG. 4A. For example, the layouts assigned to control sticks 402, 404 of FIG. 5A may include assignment of individual characters to each of a plurality of positions. Similar to the description of character entry with respect to FIGS. 4A-B, a user may select a character for entry by moving a control stick to a position corresponding to a character and pressing a selection button, such as button 414A to select the character corresponding to the control stick position.

Figure 5B:
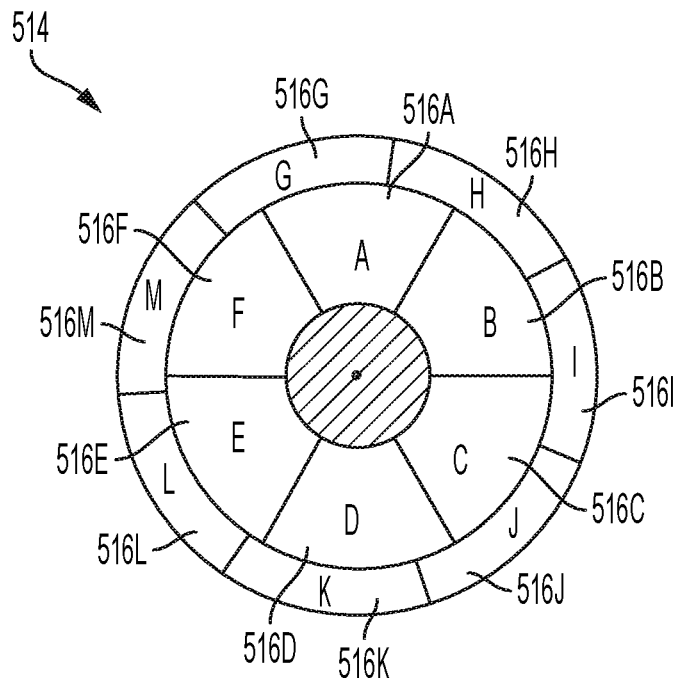
FIG. 5B is a layout of an example mapping of characters to a plurality of positions of a control stick according to some embodiments of the disclosure.

An example first layout 514, which may be assigned to first control stick 402, is shown in FIG. 5B. The first layout 514 may include a plurality of areas for positioning of a control stick assigned to a plurality of characters. For example, a first area 516A may be assigned to a first character, a second area 516B may be assigned to a second character, a third area 516C may be assigned to a third character, a fourth area 516D may be assigned to a fourth character, a fifth area 516E may be assigned to a fifth character, a sixth area 516F may be assigned to a sixth character, a seventh area 516G may be assigned to a seventh character, an eighth area 516H may be assigned to an eighth character, a ninth area 516I may be assigned to a ninth character, a tenth area 516J may be assigned to a tenth character, an eleventh area 516K may be assigned to an eleventh character, a twelfth area 516L may be assigned to a twelfth character, and a thirteenth area 516M may be assigned to a thirteenth character. In some embodiments more or fewer areas for more or fewer characters may be included in the mapping 514.

Figure 5C:
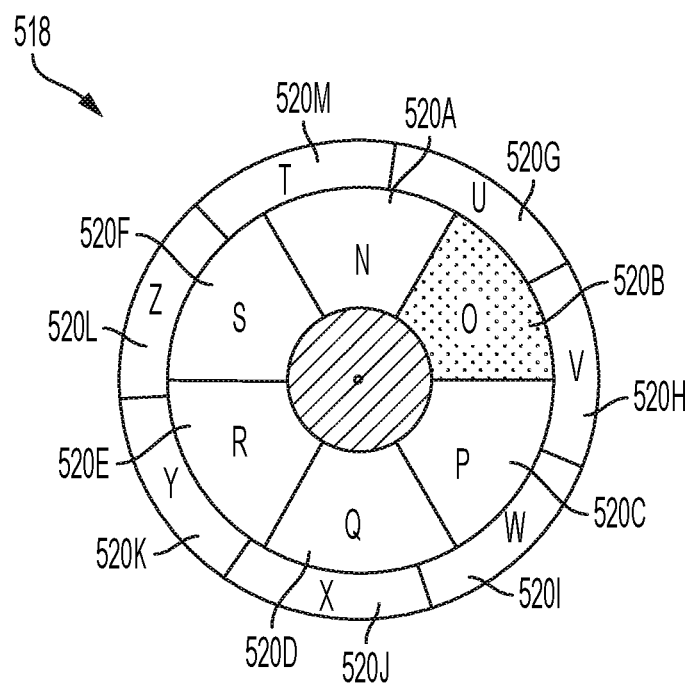
FIG. 5C is a layout of an example mapping of characters to a plurality of positions of a control stick according to some embodiments of the disclosure.

Likewise, a second layout 518 which may be assigned to second control stick 404 is shown in FIG. 5C. The second layout 518 may include a plurality of areas for positioning of a control stick assigned to a plurality of characters. In some embodiments, the characters assigned by the second layout 518 may be different from the characters assigned by the first layout 514. For example, a first area 520A may be assigned to a first character, a second area 520B may be assigned to a second character, a third area 520C may be assigned to a third character, a fourth area 520D may be assigned to a fourth character, a fifth area 520E may be assigned to a fifth character, a sixth area 520F may be assigned to a sixth character, a seventh area 520G may be assigned to a seventh character, an eighth area 520H may be assigned to an eighth character, a ninth area 520I may be assigned to a ninth character, a tenth area 520J may be assigned to a tenth character, an eleventh area 520K may be assigned to an eleventh character, a twelfth area 520L may be assigned to a twelfth character, and a thirteenth area 520M may be assigned to a thirteenth character. In some embodiments more or fewer areas for more or fewer characters may be included in the mapping 518. Thus, in some embodiments, layouts 514, 518 may each be divided into 13 areas so that an area corresponds to each letter of the alphabet.

As shown in FIG. 5B, an area of movement of a first control stick mapped to characters by the first mapping 514 may be divided into an inner portion, including areas 516A-F and an outer portion, including areas 516G-M. The outer portion 516G-M may correspond to positioning of a control stick at positions at a furthest range of movement of a control stick, such as movement of a control stick to an edge of a range of movement in certain angular directions, or positioning of a control stick beyond a first distance from an origin or center position of the control stick. Likewise, the inner portions 516A-F may correspond to positioning of a control stick at positions away from an origin or center position of the control stick but not as far as an edge of a range of movement of the control stick or within the first distance from the origin or center position of the control stick. In some embodiments, an inner portion of a range of movement of a control stick may be divided into fewer areas than an outer portion of a range of movement of a control stick, as outer portions may be easier to select than inner portions. The second mapping 518 of FIG. 5C may be laid out similarly with an outer portion including areas 520G-M and an inner portion including areas 520A-F.

In some embodiments, layouts 514, 518 may be displayed on a display for use by a user of an information handling systems. For example, display of layouts 514, 518 may allow a user to determine which characters are assigned to which positions of the control sticks 402, 404. In some embodiments, when input is received from a handheld controller, a displayed layout may be adjusted to allow a user to determine the characters corresponding to current positioning of control sticks 402, 404. For example, when input from control stick 404 is received by an information handling system indicating that the control stick 404 is in position 520B, position 520B of layout 518 may be highlighted for a user. Thus displayed layouts may enable a user to determine a character corresponding to current positions of control sticks 402, 404 before pressing a button to select the character. Similar layouts to layouts 422, 424 of FIGS. 4E-F may also be displayed for a user and may be similarly updated based on user input corresponding to the layouts 422, 424. Shoulder buttons 410A-D may also be similarly used to adjust case or Unicode variants of characters and/or to adjust selection of lower case, upper case, or symbol characters for mapping using mappings 514, 518, as described with respect to FIGS. 4A-F.

Figure 6A:
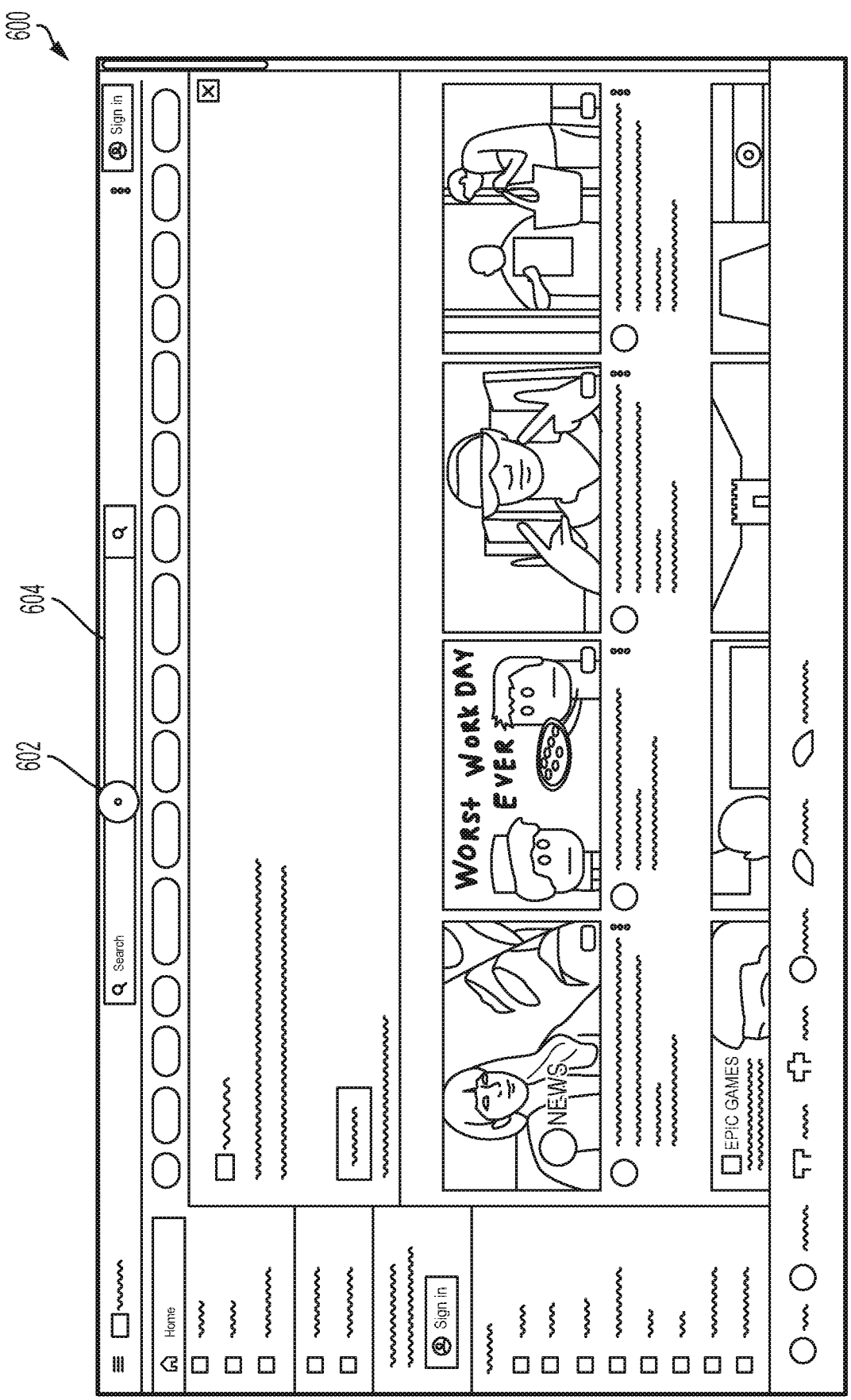
FIG. 6A is an example user interface for character entry using a handheld controller according to some embodiments of the disclosure.
Figure 6B:
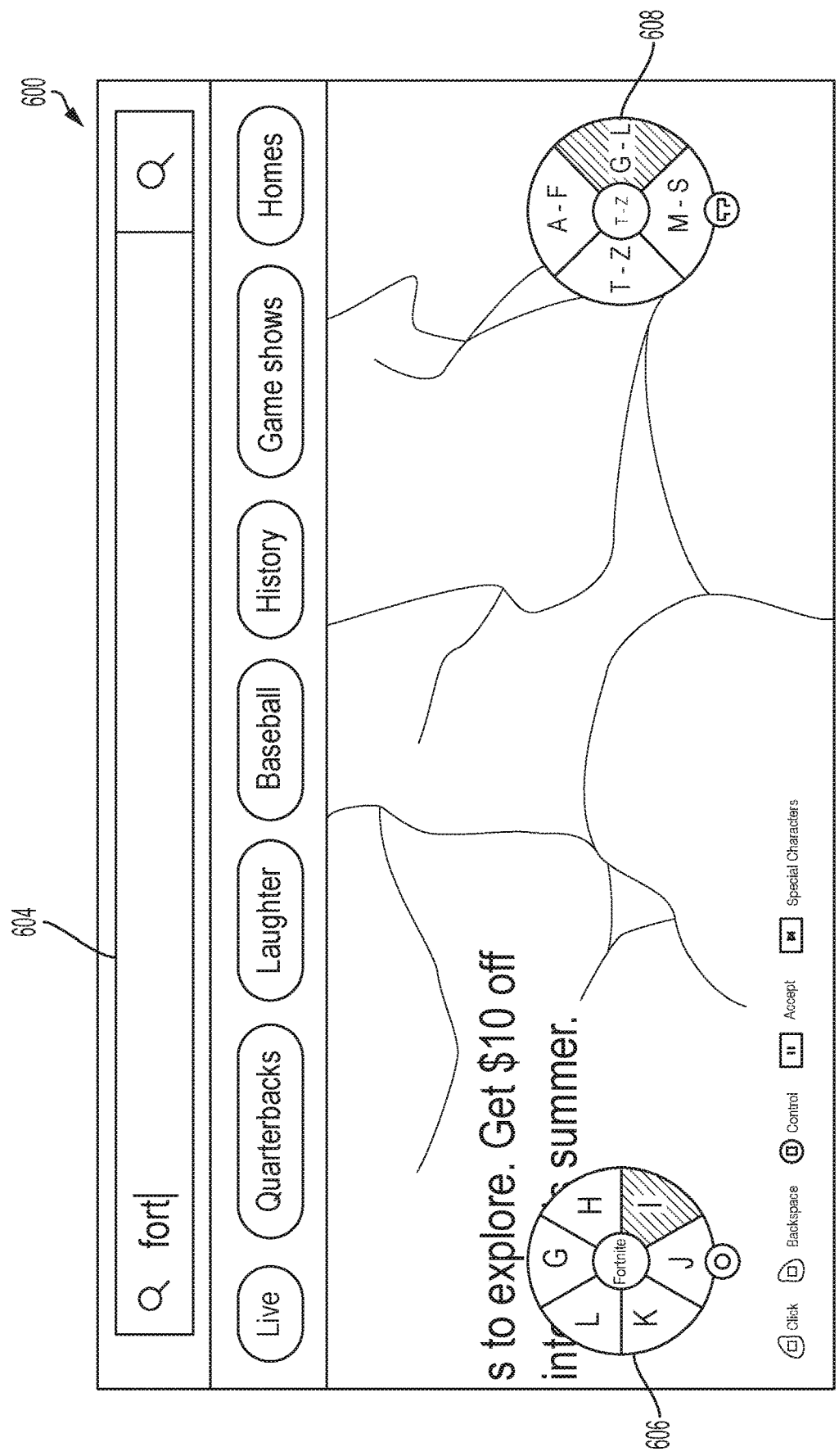
FIG. 6B is an example user interface for character entry using a handheld controller according to some embodiments of the disclosure.

An example display window 600 of an information handling system is shown in FIG. 6A. The window 600 may, for example, include a webpage. A user may control cursor 602 using a control stick, such as control stick 402 of handheld controller 400, to select a text entry box 604. When the user selects the touch entry box 604, the information handling system may display a first character entry mapping 606 and a second character entry mapping 608, as shown in FIG. 6B. In some embodiments, when the user selects the text entry box 604, the window 600 may magnify the text entry box 604. For example, the information handling system may overlay the character entry mappings 606, 608 on the window 600. In some embodiments, the first character entry mapping 606 may correspond to a left control stick, and the second character entry mapping 608 may correspond to a right control stick. The second character entry mapping 608 may, for example, indicate a plurality of sets of characters corresponding to a plurality of positions of the right control stick. The first character mapping 606 may indicate a plurality of characters of a selected set of characters corresponding to a plurality of positions of the left control stick. The second character entry mapping 608 may be updated based on input indications received from the right control stick to indicate a current position of the right control stick. For example, as shown in FIG. 6B, the second character entry mapping 608 may be updated to indicate that the right control stick is in a position corresponding to a character set including characters G-L. Based on the position of the right control stick, the first character entry mapping 606 may be updated to indicate mapping of characters G-L to positions of the left control stick. Furthermore, the first character entry mapping may indicate a current position of the left control stick, such as a position of the left control stick corresponding to the character "I". In some embodiments, the first and second character entry mappings 606, 608 may be updated to include auto-complete suggestions based on current text entry. For example, the first character entry mapping 606 may be updated to indicate an autocomplete selection in a center of the first character entry mapping corresponding to a center or null position of the left control stick. If a user presses a character selection button while the control stick is in the null position, the autocomplete text may be selected for entry. In some embodiments, the first and second character entry mappings 606, 608 may each include character mappings, similar to the mappings 514, 518 of FIGS. 5B-C. Thus, graphical indications of mappings of characters to different control stick positions may be displayed for a user and may be updated to indicate current control stick positioning.

Figure 7:
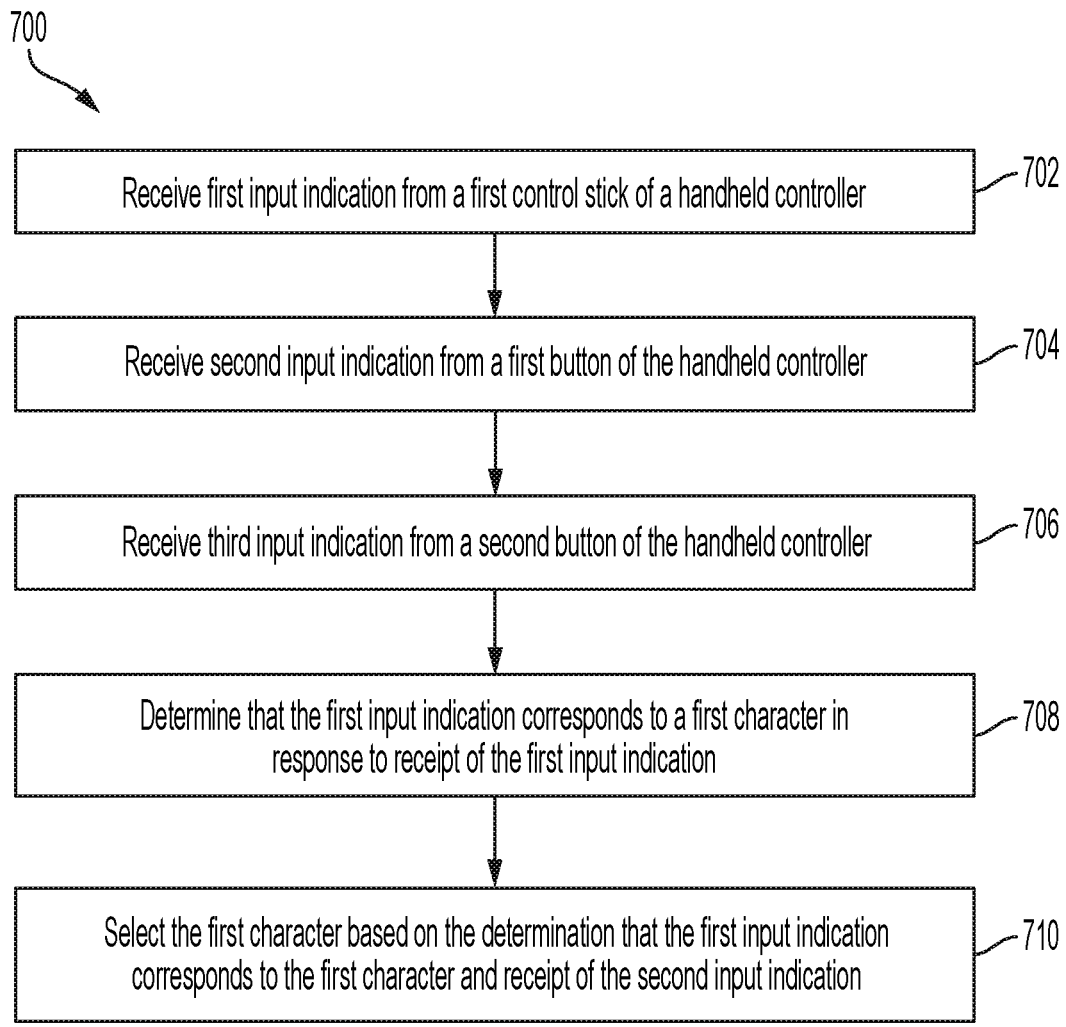
FIG. 7 is a flow chart of an example method for character entry using a handheld controller according to some embodiments of the disclosure.

An example method 700 for character entry by an information handling system is shown in FIG. 7. For example, a plurality of characters may be mapped to a plurality of positions of a control stick of a handheld controller. Based on a position of the control stick when a character select button is pressed, the information handling system may select a character for entry. At block 702, the information handling system may receive a first input indication from a first control stick of a handheld controller. The first input indication may, for example, indicate that the first control stick is in a first position.

At block 704, the information handling system may receive a second input indication from a first button of the handheld controller. The second input indication may, for example, indicate that the first button was pressed while the first control stick was in the first position. Such a button may, for example, be a button on a back of the controller as discussed with respect to FIGS. 4A-B.

In some embodiments, the information handling system may, at block 706, receive a third input indication from a second button of the handheld controller. The third input indication may be from a shoulder button of the handheld controller, as discussed with respect to FIGS. 4A-F.

At block 708, the information handling system may determine that the first input indication corresponds to a first character in response to receipt of the first input indication. For example, the information handling system may compare a position indicated by the first input indication with a mapping, such as mapping 417 of FIG. 4C, mapping 514 of FIG. 5B, or mapping 518 of FIG. 5C, of characters to areas of movement of the first control stick. Depending on which area the control stick is determined to be in based on the first input indication, the information handling system may determine the character corresponding to the first input indication. In some embodiments, such as when a third input indication is received from a second button of the handheld controller, the determination that the first input indication corresponds to the first character may be further based on the received third input indication. For example, as described above, one or more shoulder buttons may be used to adjust a case or Unicode variant of a selected character. In some embodiments, determining that the first input indication corresponds to a first character may include determining whether the first position is in an inner area of a range of movement of the first control stick or an outer area of a range of movement of the first control stick. For example, in some embodiments, areas of a range of movement of a control stick to which characters are mapped may be divided into inner and outer areas, as described above with respect to FIGS. 5B-C.

At block 710, the information handling system may select the first character based on the determination that the first input indication corresponds to the first character and based on receipt of the second input indication. For example, the second input indication may be used to determine that a user has selected the character corresponding to the first input indication for entry. Thus, characters may be entered by a user based on a position of a control stick when a character entry button is pressed. Such character entry may be easy to learn and use for users, including users with disabilities.

Figure 8:
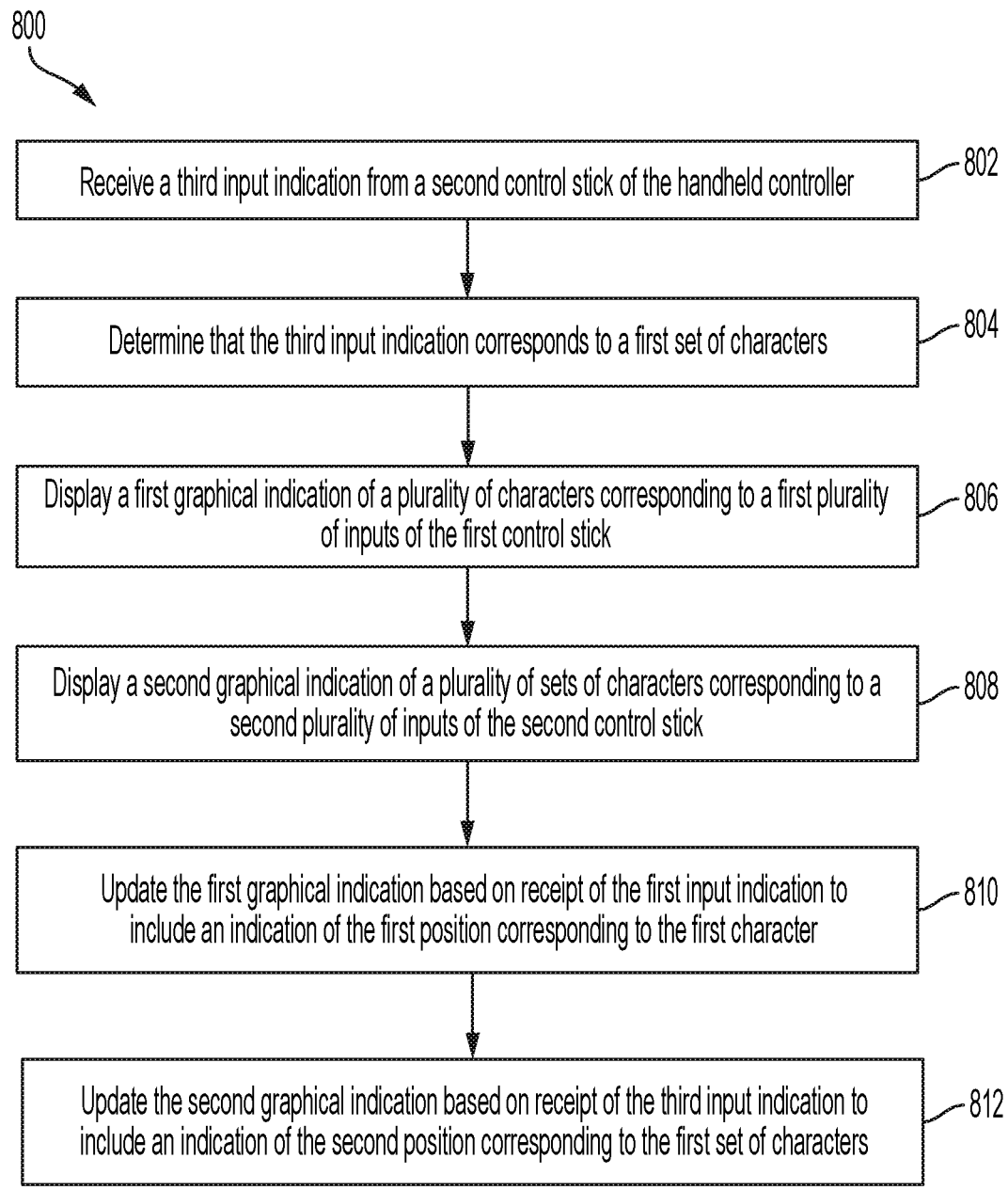
FIG. 8 is a flow chart of an example method for character entry using a handheld controller according to some embodiments of the disclosure.

In some embodiments, a first control stick may be used to select a character for entry while a second control stick may be used to select a group of characters from which the character is selected, such as described above with respect to FIGS. 4A-F. Furthermore, as described with respect to FIGS. 4A-F, graphical indications, such as layouts, of character mappings may be displayed for a user and may be updated based on inputs received from control sticks. An example method 800 for selection of characters and groups of characters using a control stick of a handheld controller is shown in FIG. 8. The method 800 may, for example, be performed along with one or more steps of the method 700 of FIG. 7. At block 802, an information handling system may receive a third input indication from a second control stick of the handheld controller. The third input indication may indicate that the second control stick is in a second position. The second control stick may, for example, be a different control stick from the first control stick of the method 700.

At block 804, the information handling system may determine that the third input indication corresponds to a first set of characters. For example, the information handling system may compare a position indicated by the third input indication with a mapping, such as mapping 418 of FIG. 4D, of sets of characters to areas of movement of the second control stick. Depending on which area the second control stick is determined to be in based on the third input indication, the information handling system may determine the set of characters corresponding to the third input indication. In some embodiments, the determination that the first input indication corresponds to a first character, described with respect to block 708 of FIG. 7, may be performed based on the determination that the third input indication corresponds to a first set of characters. For example, characters of a mapping used to determine a character corresponding to the first position of the first control stick may be determined based on the third input indication, and the character of block 708 of FIG. 7 may be a member of the first set of characters.

At block 806, the first information handling system may display a first graphical indication of a plurality of characters corresponding to a first plurality of inputs of the first control stick. For example, a layout such as the layout 415 of FIG. 4C may be displayed for a user. Likewise, at block 808 a second graphical indication of a plurality of sets of characters corresponding to a second plurality of inputs of the second control stick may be displayed. For example, a layout such as the layout 418 of FIG. 4D may be displayed for a user. In some embodiments, display of the first layout may be based on the received third input indication, such as based on a group of characters corresponding to the second position of the second control stick. Display of such layouts may enhance a user experience allowing a user to easily determine where to position one or more control sticks for character entry.

At block 810, the information handling system may update the first graphical indication based on receipt of the first input indication to include an indication of the first position corresponding to the first character. For example, the information handling system may highlight or otherwise indicate an area of a first layout to indicate where the first control stick is currently positioned. Likewise, at block 812, the information handling system may update the second graphical indication based on receipt of the third input indication to include an indication of the second position corresponding to the first set of characters. For example, the information handling system may highlight or otherwise indicate an area of a second layout to indicate where the second control stick is currently positioned. Thus, a second control stick may be used to select from among a plurality of groups of characters to configure characters selectable by the first control stick of method 700, and graphical indications of mappings of characters and/or sets of characters to positions of first and second control sticks may be displayed by an information handling system.

Figure 9:
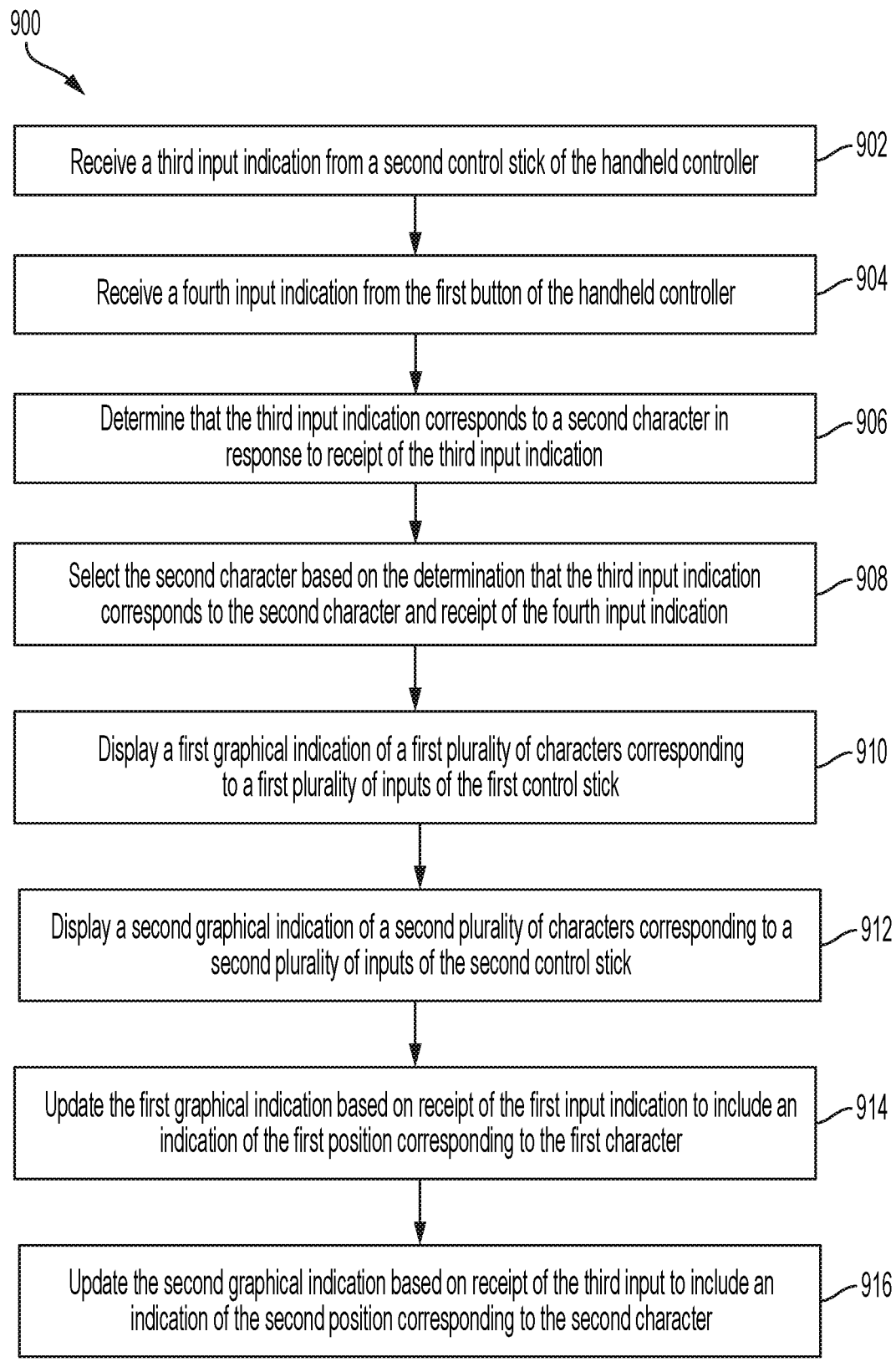
FIG. 9 is a flow chart of an example method for character entry using a handheld controller according to some embodiments of the disclosure.

In some embodiments, a first set of characters may be mapped to positions of a first control stick and a second, different, set of characters may be mapped to positions of a second control stick, such as described with respect to FIGS. 5A-C. For example, 13 alphabetical characters may be mapped to 13 areas of a range of movement of a first control stick, and 13 alphabetical characters may be mapped to 13 areas of a range of movement of a second control stick. An example method 900 for character entry using two control sticks is shown in FIG. 9. The method 900 may, for example, be performed along with one or more steps of the method 700 of FIG. 7. At block 902, an information handling system may receive a third input indication from a second control stick of the handheld controller. The third input indication may indicate that the second control stick is in a second position. The second control stick may, for example, be a different control stick from the first control stick of the method 700.

At block 904, the information handling system may receive a fourth input indication from the first button of the handheld controller. The first button, may, for example, be the first button of method 700. The fourth input indication may, for example, indicate that the first button is pressed while the second control stick is in the second position.

At block 906, the information handling system may determine that the third input indication corresponds to a second character in response to receipt of the third input indication. For example, the information handling system may compare a position indicated by the third input indication with a mapping, such as mapping 518 of FIG. 5C, of sets of characters to areas of movement of the second control stick. Depending on which area the second control stick is determined to be in based on the third input indication, the information handling system may determine the set of characters corresponding to the second input indication. At block 908, the information handling system may select the second character based on the determination that the third input indication corresponds to the second character and based on receipt of the fourth input indication. Thus, two control sticks may be used, in combination with a character selection button, to input different characters.

At block 910, the first information handling system may display a first graphical indication of a plurality of characters corresponding to a first plurality of inputs of the first control stick. For example, a layout such as the layout 514 of FIG. 5B may be displayed for a user. Likewise, at block 912 a second graphical indication of a plurality of characters corresponding to a second plurality of inputs of the second control stick may be displayed. For example, a layout such as the layout 518 of FIG. 5C may be displayed for a user. Display of such layouts may enhance a user experience allowing a user to easily determine where to position one or more control sticks for character entry.

At block 914, the information handling system may update the first graphical indication based on receipt of the first input indication to include an indication of the first position corresponding to the first character. For example, the information handling system may highlight or otherwise indicate an area of a first layout to indicate where the first control stick is currently positioned. Likewise, at block 916, the information handling system may update the second graphical indication based on receipt of the third input indication to include an indication of the second position corresponding to the second character. For example, the information handling system may highlight or otherwise indicate an area of a second layout to indicate where the second control stick is currently positioned. Thus, first and second control sticks may be used to select from among a plurality of characters, and graphical indications of mappings of characters to positions of first and second control sticks may be displayed by an information handling system.

Figure 10:
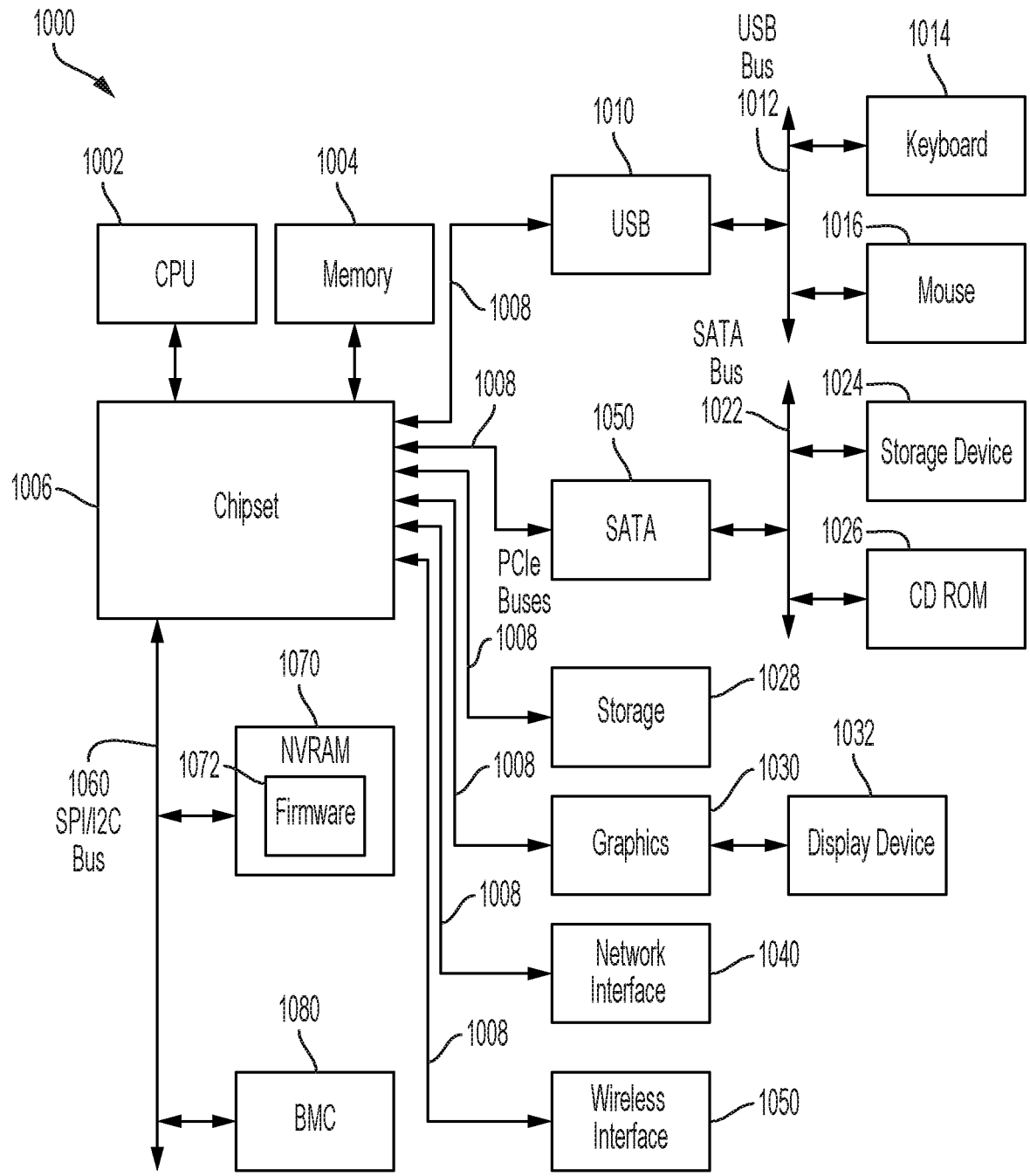
FIG. 10 is a schematic block diagram of an example information handling system according to some embodiments of the disclosure.

FIG. 10 illustrates an example information handling system 1000. Information handling system 1000 may include a processor 1002 (e.g., a central processing unit (CPU)), a memory (e.g., a dynamic random-access memory (DRAM)) 1004, and a chipset 1006. In some embodiments, one or more of the processor 1002, the memory 1004, and the chipset 1006 may be included on a motherboard (also referred to as a mainboard), which is a printed circuit board (PCB) with embedded conductors organized as transmission lines between the processor 1002, the memory 1004, the chipset 1006, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1002, the memory 1004, the chipset 1006, and/or other components may be organized as a System on Chip (SoC).

The processor 1002 may execute program code by accessing instructions loaded into memory 1004 from a storage device, executing the instructions to operate on data also loaded into memory 1004 from a storage device, and generate output data that is stored back into memory 1004 or sent to another component. The processor 1002 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1002 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1006 may facilitate the transfer of data between the processor 1002, the memory 1004, and other components. In some embodiments, chipset 1006 may include two or more integrated circuits (ICs), such as a northbridge controller coupled to the processor 1002, the memory 1004, and a southbridge controller, with the southbridge controller coupled to the other components such as USB 1010, SATA 1020, and PCIe buses 1008. The chipset 1006 may couple to other components through one or more PCIe buses 1008.

Some components may be coupled to one bus line of the PCIe buses 1008, whereas some components may be coupled to more than one bus line of the PCIe buses 1008. One example component is a universal serial bus (USB) controller 1010, which interfaces the chipset 1006 to a USB bus 1012. A USB bus 1012 may couple input/output components such as a keyboard 1014 and a mouse 1016, but also other components such as USB flash drives, or another information handling system. Another example component is a SATA bus controller 1020, which couples the chipset 1006 to a SATA bus 1022. The SATA bus 1022 may facilitate efficient transfer of data between the chipset 1006 and components coupled to the chipset 1006 and a storage device 1024 (e.g., a hard disk drive (HDD) or solid-state disk drive (SDD)) and/or a compact disc read-only memory (CD-ROM) 1026. The PCIe bus 1008 may also couple the chipset 1006 directly to a storage device 1028 (e.g., a solid-state disk drive (SDD)). A further example of an example component is a graphics device 1030 (e.g., a graphics processing unit (GPU)) for generating output to a display device 1032, a network interface controller (NIC) 1040, and/or a wireless interface 1050 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1006 may also be coupled to a serial peripheral interface (SPI) and/or Inter-Integrated Circuit (I2C) bus 1060, which couples the chipset 1006 to system management components. For example, a non-volatile random-access memory (NVRAM) 1070 for storing firmware 1072 may be coupled to the bus 1060. As another example, a controller, such as a baseboard management controller (BMC) 1080, may be coupled to the chipset 1006 through the bus 1060. BMC 1080 may be referred to as a service processor or embedded controller (EC). Capabilities and functions provided by BMC 1080 may vary considerably based on the type of information handling system. For example, the term baseboard management system may be used to describe an embedded processor included at a server, while an embedded controller may be found in a consumer-level device. As disclosed herein, BMC 1080 represents a processing device different from processor 1002, which provides various management functions for information handling system 1000. For example, an embedded controller may be responsible for power management, cooling management, and the like. An embedded controller included at a data storage system may be referred to as a storage enclosure processor or a chassis processor.

System 1000 may include additional processors that are configured to provide localized or specific control functions, such as a battery management controller. Bus 1060 can include one or more busses, including a Serial Peripheral Interface (SPI) bus, an Inter-Integrated Circuit (I2C) bus, a system management bus (SMBUS), a power management bus (PMBUS), or the like. BMC 1080 may be configured to provide out-of-band access to devices at information handling system 1000. Out-of-band access in the context of the bus 1060 may refer to operations performed prior to execution of firmware 1072 by processor 1002 to initialize operation of system 1000.

Firmware 1072 may include instructions executable by processor 102 to initialize and test the hardware components of system 1000. For example, the instructions may cause the processor 1002 to execute a power-on self-test (POST). The instructions may further cause the processor 1002 to load a boot loader or an operating system (OS) from a mass storage device. Firmware 1072 additionally may provide an abstraction layer for the hardware, such as a consistent way for application programs and operating systems to interact with the keyboard, display, and other input/output devices. When power is first applied to information handling system 1000, the system may begin a sequence of initialization procedures, such as a boot procedure or a secure boot procedure. During the initialization sequence, also referred to as a boot sequence, components of system 1000 may be configured and enabled for operation and device drivers may be installed. Device drivers may provide an interface through which other components of the system 1000 can communicate with a corresponding device. The firmware 1072 may include a basic input-output system (BIOS) and/or include a unified extensible firmware interface (UEFI). Firmware 1072 may also include one or more firmware modules of the information handling system. Additionally, configuration settings for the firmware 1072 and firmware of the information handling system 1000 may be stored in the NVRAM 1070. NVRAM 1070 may, for example, be a non-volatile firmware memory of the information handling system 1000 and may store a firmware memory map namespace 1000 of the information handling system. NVRAM 1070 may further store one or more container-specific firmware memory map namespaces for one or more containers concurrently executed by the information handling system.

Information handling system 1000 may include additional components and additional busses, not shown for clarity. For example, system 1000 may include multiple processor cores (either within processor 1002 or separately coupled to the chipset 1006 or through the PCIe buses 1008), audio devices (such as may be coupled to the chipset 1006 through one of the PCIe busses 1008), or the like. While a particular arrangement of bus technologies and interconnections is illustrated for the purpose of example, one of skill will appreciate that the techniques disclosed herein are applicable to other system architectures. System 1000 may include multiple processors and/or redundant bus controllers. In some embodiments, one or more components may be integrated together in an integrated circuit (IC), which is circuitry built on a common substrate. For example, portions of chipset 1006 can be integrated within processor 1002. Additional components of information handling system 1000 may include one or more storage devices that may store machine-executable code, one or more communications ports for communicating with external devices, and various input and output (I/O) devices, such as a keyboard, a mouse, and a video display.

In some embodiments, processor 1002 may include multiple processors, such as multiple processing cores for parallel processing by the information handling system 1000. For example, the information handling system 1000 may include a server comprising multiple processors for parallel processing. In some embodiments, the information handling system 1000 may support virtual machine (VM) operation, with multiple virtualized instances of one or more operating systems executed in parallel by the information handling system 1000. For example, resources, such as processors or processing cores of the information handling system may be assigned to multiple containerized instances of one or more operating systems of the information handling system 1000 executed in parallel. A container may, for example, be a virtual machine executed by the information handling system 1000 for execution of an instance of an operating system by the information handling system 1000. Thus, for example, multiple users may remotely connect to the information handling system 1000, such as in a cloud computing configuration, to utilize resources of the information handling system 1000, such as memory, processors, and other hardware, firmware, and software capabilities of the information handling system 1000. Parallel execution of multiple containers by the information handling system 1000 may allow the information handling system 1000 to execute tasks for multiple users in parallel secure virtual environments.

The schematic or flow chart diagrams FIGS. 7-9 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
  receiving, by an information handling system, a first input indication from a first control stick of a handheld controller, wherein the first input indication indicates that the first control stick is in a first position;
  receiving, by an information handling system, a second input indication from a second control stick of the handheld controller, wherein the second input indication indicates that the second control stick is in a second position;
  receiving, by the information handling system, a third input indication from a first button of the handheld controller, wherein the third input indication indicates that the first button is pressed while the first control stick is in the first position and while the second control stick is in the second position;
  determining, by the information handling system, that the combination of the first input indication and the second input indication corresponds to a first character in response to receipt of the first input indication and second input indication; and
  selecting, by the information handling system, the first character based on the determination that the combination of the first input indication and the second input indication corresponds to the first character and receipt of the third input indication.

2. The method of claim 1, further comprising:
  determining, by the information handling system, that the second input indication corresponds to a first set of characters in response to receipt of the second input indication,
  wherein the first set of characters includes the first character, and
  wherein determining that the combination of the first input indication and the second input indication corresponds to the first character is based on the determination that the second input indication corresponds to the first set of characters.

3. The method of claim 2, further comprising:
  displaying, by the information handling system, a first graphical indication of a plurality of characters corresponding to a first plurality of inputs of the first control stick;
  displaying, by the information handling system, a second graphical indication of a plurality of sets of characters corresponding to a second plurality of inputs of the second control stick;
  updating, by the information handling system, the first graphical indication based on receipt of the first input indication to include an indication of the first position corresponding to the first character; and
  updating, by the information handling system, the second graphical indication based on receipt of the second input indication to include an indication of the second position corresponding to the first set of characters.

4. The method of claim 1, further comprising:
  receiving, by the information handling system, a fourth input indication from the first control stick of the handheld controller, wherein the fourth input indication indicates that the first control stick is in a third position;
  receiving, by the information handling system, a fifth input indication from the second control stick of the handheld controller, wherein the fifth input indication indicates that the second control stick is in a fourth position;
  receiving, by the information handling system, a sixth input indication from the first button of the handheld controller, wherein the fifth input indication indicates that the second button is pressed while the second control stick is in the fourth position;
  determining, by the information handling system, that the combination of the fourth input indication and the fifth input indication corresponds to a second character, different from the first character, in response to receipt of the fourth input indication and the fifth input indication; and
  selecting, by the information handling system, the second character based on the determination that the combination of the fourth input indication and the fifth input indication corresponds to the second character and receipt of the sixth input indication.

5. The method of claim 4, further comprising:
  displaying, by the information handling system, a first graphical indication of a first plurality of characters corresponding to a first plurality of inputs of the first control stick;
  displaying, by the information handling system, a second graphical indication of a plurality of sets of characters corresponding to a second plurality of inputs of the second control stick;
  updating, by the information handling system, the first graphical indication based on receipt of the fourth input indication to include an indication of the third position corresponding to the second character; and
  updating, by the information handling system, the second graphical indication based on receipt of the fifth input indication to include an indication of the fourth position corresponding to a first set of characters comprising the second character.

6. The method of claim 1, wherein determining that the combination of the first input indication and second input indication corresponds to a first character comprises determining whether the first position is in an inner area of a range of movement of the first control stick or an outer area of a range of movement of the first control stick.

7. The method of claim 1, further comprising:
  receiving, by the information handling system, a fourth input indication from a first shoulder button of the handheld controller,
  wherein determining that the combination of the first input indication and second input indication corresponds to the first character is performed based on the fourth input indication.

8. An information handling system, comprising:
  a memory; and at least one processor coupled to the memory, wherein the at least one processor is configured to:

receive a first input indication from a first control stick of a handheld controller, wherein the first input indication indicates that the first control stick is in a first position;

receive a second input indication from a second control stick of the handheld controller, wherein the second input indication indicates that the second control stick is in a second position;

receive a third input indication from a first button of the handheld controller, wherein the third input indication indicates that the first button is pressed while the first control stick is in the first position and while the second control stick is in the second position;

determine that the combination of the first input indication and the second input indication corresponds to a first character in response to receipt of the first input indication and the second input indication; and select the first character based on the determination that the combination of the first input indication and the second input indication corresponds to the first character and receipt of the third input indication.

9. The information handling system of claim 8, wherein the at least one processor is further configured to:

determine that the second input indication corresponds to a first set of characters in response to receipt of the second input indication;

wherein the first set of characters includes the first character, and wherein the at least one processor is configured to determine that the combination of the first input indication and the second input indication corresponds to the first character based on the determination that the second input indication corresponds to the first set of characters.

10. The information handling system of claim 9, wherein the at least one processor is further configured to:

display a first graphical indication of a plurality of characters corresponding to a first plurality of inputs of the first control stick;

display a second graphical indication of a plurality of sets of characters corresponding to a second plurality of inputs of the second control stick;

update the first graphical indication based on receipt of the first input indication to include an indication of the first position corresponding to the first character; and update the second graphical indication based on receipt of the second input indication to include an indication of the second position corresponding to the first set of characters.

11. The information handling system of claim 8, wherein the at least one processor is further configured to:

receive a fourth input indication from the first control stick of the handheld controller, wherein the fourth input indication indicates that the first control stick is in a third position;

receive a fifth input indication from the second control stick of the handheld controller, wherein the fifth input indication indicates that the second control stick is in a fourth position;

receive a sixth input indication from the first button of the handheld controller, wherein the sixth input indication indicates that the first button is pressed while the second control stick is in the fourth position;

determine that the combination of the fourth input indication and the fifth input indication corresponds to a second character, different from the first character, in response to receipt of the fourth input indication and the fifth input indication; and select the second character based the determination that the combination of the fourth input indication and the fifth input indication corresponds to the second character and receipt of the sixth input indication.

12. The information handling system of claim 11, wherein the at least one processor is further configured to:

display a first graphical indication of a first plurality of characters corresponding to a first plurality of inputs of the first control stick;

display a second graphical indication of a plurality of sets of characters corresponding to a second plurality of inputs of the second control stick;

update the first graphical indication based on receipt of the fourth input indication to include an indication of the third position corresponding to the second character; and update the second graphical indication based on receipt of the fifth input indication to include an indication of the fourth position corresponding to a first set of characters comprising the second character.

13. The information handling system of claim 8, wherein to determine that the combination of the first input indication and second input indication corresponds to a first character, the at least one processor is configured to determine whether the first position is in an inner area of a range of movement of the first control stick or an outer area of a range of movement of the first control stick.

14. The information handling system of claim 8, wherein the at least one processor is further configured to:

receive a fourth input indication from a first shoulder button of the handheld controller, wherein the at least one processor is configured to determine that the combination of the first input indication and the second input indication indication corresponds to the first character based on the fourth input indication.

15. A computer program product, comprising:

a non-transitory computer readable medium comprising instructions for causing an information handling system to perform steps comprising:

receiving a first input indication from a first control stick of a handheld controller, wherein the first input indication indicates that the first control stick is in a first position;

receiving a second input indication from a second control stick of the handheld controller, wherein the second input indication indicates that the second control stick is in a second position;

receiving a third input indication from a first button of the handheld controller, wherein the third input indication indicates that the first button is pressed while the first control stick is in the first position and while the second control stick is in the second position;

determining that the combination of the first input indication and the second input indication corresponds to a first character in response to receipt of the first input indication and the second input indication; and selecting the first character based on the determination that the combination of the first input indication and the second input indication corresponds to the first character and receipt of the third input indication.

16. The computer program product of claim 15, wherein the non-transitory computer readable medium further comprises instructions for causing the information handling system to perform steps comprising:

determining that the second input indication corresponds to a first set of characters in response to receipt of the second input indication,
wherein the first set of characters includes the first character, and
wherein determining that the combination of the first input indication and the second input indication corresponds to the first character is based on the determination that the second input indication corresponds to the first set of characters.

17. The computer program product of claim 16, wherein the non-transitory computer readable medium further comprises instructions for causing the information handling system to perform steps comprising:
displaying a first graphical indication of a plurality of characters corresponding to a first plurality of inputs of the first control stick;
displaying a second graphical indication of a plurality of sets of characters corresponding to a second plurality of inputs of the second control stick;
updating the first graphical indication based on receipt of the first input indication to include an indication of the first position corresponding to the first character; and
updating the second graphical indication based on receipt of the second input indication to include an indication of the second position corresponding to the first set of characters.

18. The computer program product of claim 16, wherein the non-transitory computer readable medium further comprises instructions for causing the information handling system to perform steps comprising:
receiving a fourth input indication from the first control stick of the handheld controller, wherein the fourth input indication indicates that the first control stick is in a third position;
receiving a fifth input indication from the second control stick of the handheld controller, wherein the fifth input indication indicates that the second control stick is in a fourth position;
receiving a sixth input indication from the first button of the handheld controller, wherein the sixth input indication indicates that the first button is pressed while the second control stick is in the fourth position;
determining that the combination of the fourth input indication and the fifth input indication corresponds to a second character, different from the first character, in response to receipt of the fourth input indication and the fifth input indication; and
selecting the second character based the determination that the combination of the fourth input indication and the fifth input indication corresponds to the second character and receipt of the sixth input indication.

19. The computer program product of claim 18, wherein the non-transitory computer readable medium further comprises instructions for causing the information handling system to perform steps comprising:
displaying a first graphical indication of a first plurality of characters corresponding to a first plurality of inputs of the first control stick;
displaying a second graphical indication of a plurality of sets of characters corresponding to a second plurality of inputs of the second control stick;
updating the first graphical indication based on receipt of the fourth input indication to include an indication of the third position corresponding to the second character; and
updating the second graphical indication based on receipt of the fifth input indication to include an indication of the fourth position corresponding to a first set of characters comprising the second character.

20. The computer program product of claim 16, wherein determining that the combination of the first input indication and second input indication corresponds to a first character comprises determining whether the first position is is in an inner area of a range of movement of the first control stick or an outer area of a range of movement of the first control stick.

* * * * *